United States Patent [19]

Bennett

[11] 3,803,354

[45] Apr. 9, 1974

[54] FREQUENCY SHIFT DIGITAL COMMUNICATION SYSTEM

[75] Inventor: Walter V. Bennett, Granada Hills, Calif.

[73] Assignee: The Singer Company, New York, N.Y.

[22] Filed: June 17, 1971

[21] Appl. No.: 154,100

[52] U.S. Cl. .............................. 178/66 R, 331/179

[51] Int. Cl. .............................. H04l 27/12

[58] Field of Search .............................. 325/30, 163, 145; 178/66 R, 66 A, 67; 331/179, 135, 136, 143

[56] References Cited

UNITED STATES PATENTS

| | | | |
|---|---|---|---|
| 3,206,677 | 9/1965 | Wier | 178/66 R |
| 3,451,012 | 6/1969 | Spiro | 325/163 |
| 3,611,209 | 10/1971 | Saltzborg | 178/66 R |
| 3,611,148 | 10/1971 | Cox | 178/66 R |
| 3,454,718 | 7/1969 | Perreault | 325/163 |

*Primary Examiner*—Benedict V. Safourek
*Attorney, Agent, or Firm*—Linval B. Castle

[57] ABSTRACT

A high speed frequency shift digital communication system is provided for digital data using frequency shift keying techniques. The system of the invention produces one cycle of carrier per bit of digital information. A frequency shift modulator is used which operates as a clock for a data register. When the binary data input is a "1", the modulator switches to minimum feedback delay. When the binary input is a "0", the modulator switches to a longer feedback delay.

3 Claims, 4 Drawing Figures

FREQUENCY SHIFT KEYED MODULATOR

INVENTOR:
WALTER V. BENNETT

By [signature]
ATTORNEY

INVENTOR:
WALTER V. BENNETT
By [signature]
ATTORNEY

FREQUENCY SHIFT DIGITAL COMMUNICATION SYSTEM

This invention may be practiced by or for the United States Government without payment of royalties.

BACKGROUND OF THE INVENTION

Prior art systems using frequency shift keyed modulation techniques usually employ two distinct carrier frequencies which are displaced by an amount equal to at least ten times the modulation rate. The carrier frequencies themselves are usually $10^3$ to $10^{12}$ times the modulation frequency.

The system of the present invention, on the other hand, is a high speed frequency shift keyed binary data transmission system which has a data rate equal to the carrier frequency. This identity means that each cycle of $f_1$ carrier frequency represents a binary "1", and each cycle of $f_2$ carrier represents a binary "0".

The high speed system of the invention permits binary data to be transmitted in a serial manner on a commercially feasible basis. The advantages of serial transmission over parallel transmission of the data include a reduction in the complexity, power, size and cost of the circuitry involved.

DETAILED DESCRIPTION OF THE ILLUSTRATED EMBODIMENT

Figure 1:
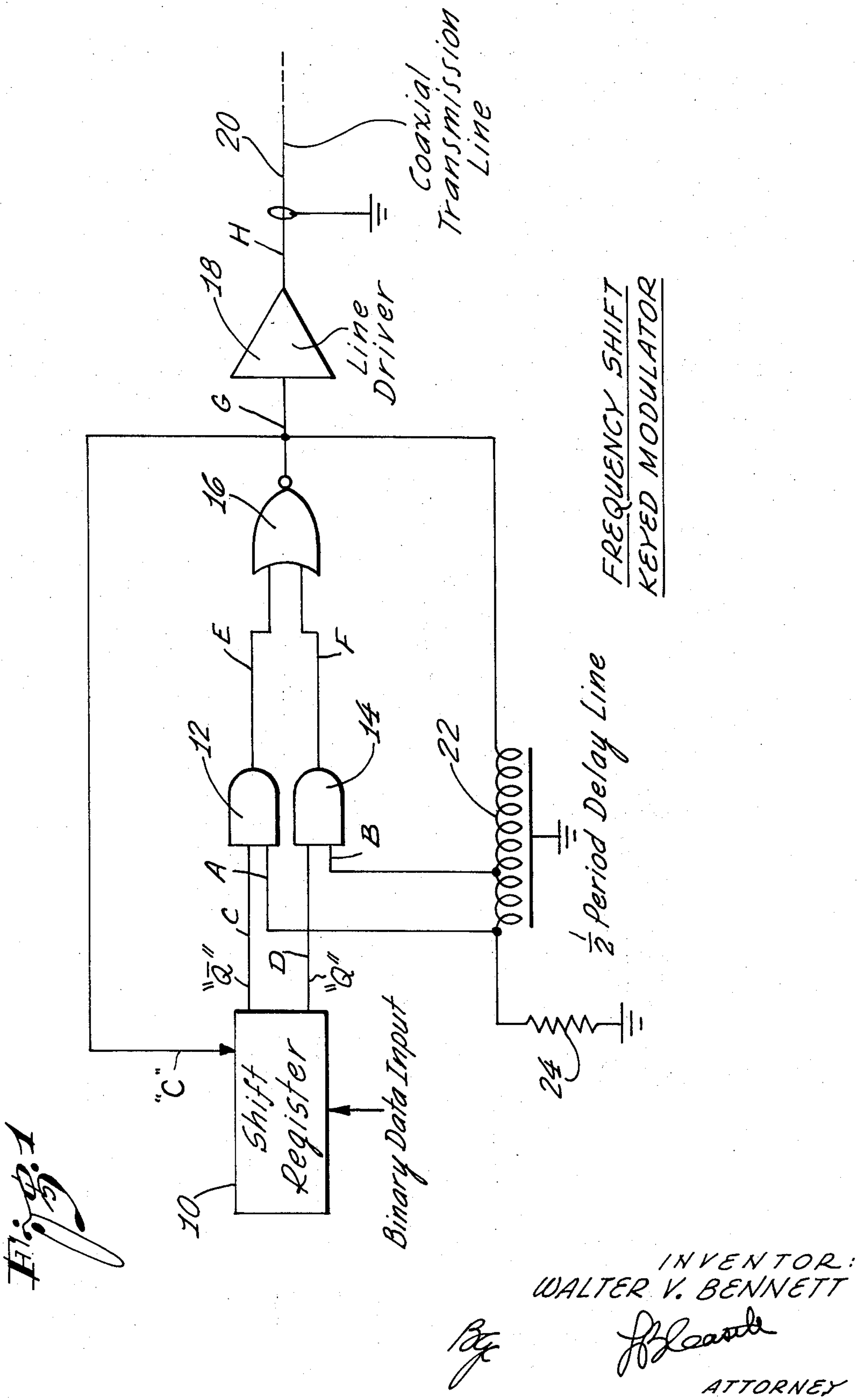
FIG. 1 is a schematic diagram, partly in block form and partly in circuit detail, of a frequency shift keyed modulator employing the concepts of the invention.

A frequency shift keyed modulator circuit is shown in FIG. 1 which operates as a clock for a data register 10. The register 10 may be any usual type of static register, for example, which is made up of a plurality of flip-flops, with a separate flip-flop being provided for each bit of the data to be stored in the register. The flip-flops in the usual static register are connected so that they may be individually and simultaneously controlled by the input data to assume respective states corresponding to the bits of the input data, such a control being termed a "parallel" control. Then, the data stored in the static register may subsequently be shifted out of the register by introducing clock pulses, for example, to the flip-flop representing the least significant bit, so that the shift register in effect "counts," with the data being shifted out of the other end of the register on a bit-by-bit "serial" basis. The binary data to be transmitted may be fed into the register from time to time on a parallel basis, and the data is then fed serially into the modulator circuit by the clock pulses C which control the shift register 10 in known manner.

The shift register is used as a buffer since the timing of the serial link is asynchronous to the source and destination timing. This is because the data rate of a message containing all 1's, for example, is different from the data rate of a message containing 0's. In addition to the circuitry shown in FIG. 1, any known type of logic control circuit may be used to sense the presence of a data word to be transmitted, to strobe the data into the shift register, buffer 10, and to start the modulator process. When the register 10 is empty, the control circuit then enters the next data word into the register.

In the illustrated embodiment, the "false", or complement, output $\bar{Q}$ of the register 10 is applied to an AND gate 12, and the "true" output Q of the register is applied to an AND gate 14. Specifically, whenever a binary 1 is shifted out of the register 10, the output lead designated Q becomes 0 to disable the AND gate 12, and the output lead designated Q becomes 1 to enable the AND gate 14. On the other hand, whenever a binary 0 is shifted out of the register, the lead Q becomes a 1 to enable the AND gate 12, and the lead Q becomes a 0 to disable the AND gate 14. The AND gates are connected to an OR gate 16, which is connected to a line driver 18. The line driver applies the frequency shift keyed data signal to the transmission line 20, which may be a coaxial cable, for example. The line driver 18 serves as an impedance match between the modulator circuit and the transmission line, and also provides a third, or "off," state that is necessary to maintain the average signal potential during inactive periods.

The OR gate 16 is also connected back to the shift register 10, and it supplies clock signals to the register which cause the data in the register to be shifted serially into the modulator circuit in a manner known to the art. Clocking the data into the modulator gates must be accomplished during the time both gates are disabled. The modulator output is of opposite phase from the input and, for that reason, the positive-going edge of each cycle of the output signal is used for the shift register clock.

The output of OR gate 16 is also connected to the input of a ½ period delay line 22, which is terminated by a suitable impedance 24. The output of the delay line is connected to the AND gate 12, and an intermediate tap on the delay line is connected to the AND gate 14. When a data bit Q from the shift register 10 is a 1, the modulator switches to the tap on the delay line 22 to operate with minimum feedback delay. When a data bit $\bar{Q}$ from the shift register is a 1, the entire delay line 22 is used to provide maximum feedback delay. Proper choice of the delay line 22 and of its terminating impedance 24 is required to achieve desired levels of driving voltage and current, and signal and reflection levels.

Figure 4:
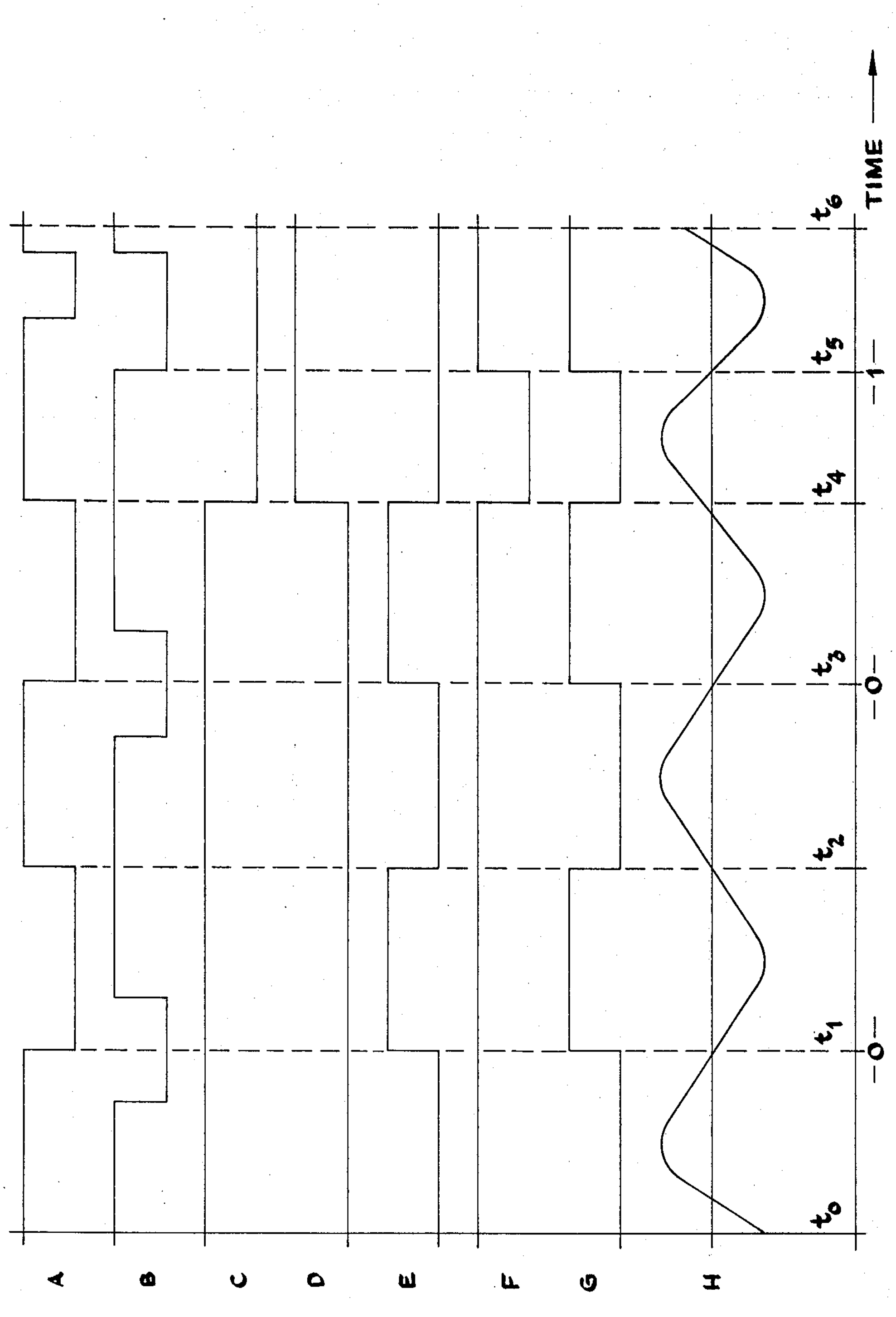
FIG. 4 is a representation of a series of curves useful in explaining the operation of the system of the invention.

The operation of the system of FIG. 1 is illustrated graphically by the curves of FIG. 4. When the circuit of FIG. 1 is first energized at time $t_0$, the AND gates 12 and 14 are enabled, by the waveforms A and B. Then, assuming that during the first clock interval the bit output of the shift register 10 is a 0, the term $\bar{Q}$ will become a 1, the C waveform will become high, and the output E of the AND gate 12 will swing low. Since the term Q remains low during the first clock interval, the output F of the AND gate 14 remains high.

As the output E of the AND gate 12 swings low during the first clock interval, a pulse is introduced by the OR gate 16 to the delay line 22. The intermediate output B of the delay line swings low after a particular time interval, but is ineffective since the AND gate 14 is not conductive. Subsequently the output A from the delay line swings low to disable the gate 12 at time $t_1$. At that time the output E of the gate 12 rises to its original level, and this continues until time $t_2$, when the second cycle begins.

The OR gate 16 supplies a clock pulse to the shift register at time $t_1$, by the positive-going edge of the waveform E, to assure that the next bit will be shifted out of the shift register during the time that both the gates 12 and 14 are disabled.

Assuming that the next bit also is a 0, the cycle is repeated in the time interval $t_2$–$t_4$.

Then, at $t_4$, it is assumed that a 1 is shifted out of the shift register. For that cycle, the AND gate 14, rather than the AND gate 12 is rendered conductive, so that the output F drops, as shown in FIG. 4. The AND gate 14 remains disabled until the leading edge of the delayed pulse appears at the intermediate tap of the delay line 22, at which time ($t_5$) the signal B drops so that the output F of the AND gate 14 resumes its original level at $t_5$. Again, a clock pulse is introduced to the shift register 10 at time $t_5$ so that the next bit may be shifted out of the shift register, to permit the cycle to be repeated at time $t_6$.

The aforesaid action continues from period-to-period, with the time of the period being determined whether a 1 or a 0 is shifted out of the shift register by each successive clock pulse. The line driver circuit 18 inverts the phase of each cycle, so that the output shown in FIG. 3 is applied to the coaxial transmission line 20.

Figure 3:
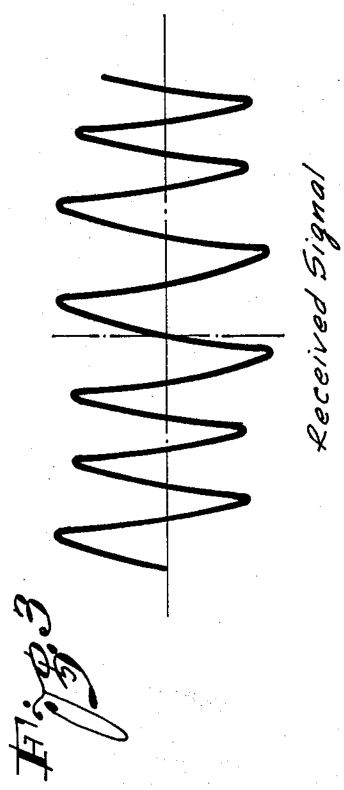
FIG. 3 is a curve representing the signal received by the receiver of FIG. 2.

In the waveform of FIG. 3, for example, three binary 1's are shown to have occurred successively at the output, so that three cycles of a particular repetition frequency occur. Then, at the end of the third period, it is assumed that the next output from the shift register is a binary 0, so that the third period is no longer than the preceding three periods, as explained above.

Then, the next two succeeding bits in the waveform of FIG. 3 are assumed to be binary 1's, so that the periods return to their original length. In this way, each cycle of the signal applied to the coaxial transmission line 20 has a relatively short period if a binary 1 is represented, and a relatively long period if a binary 0 is represented.

Figure 2:
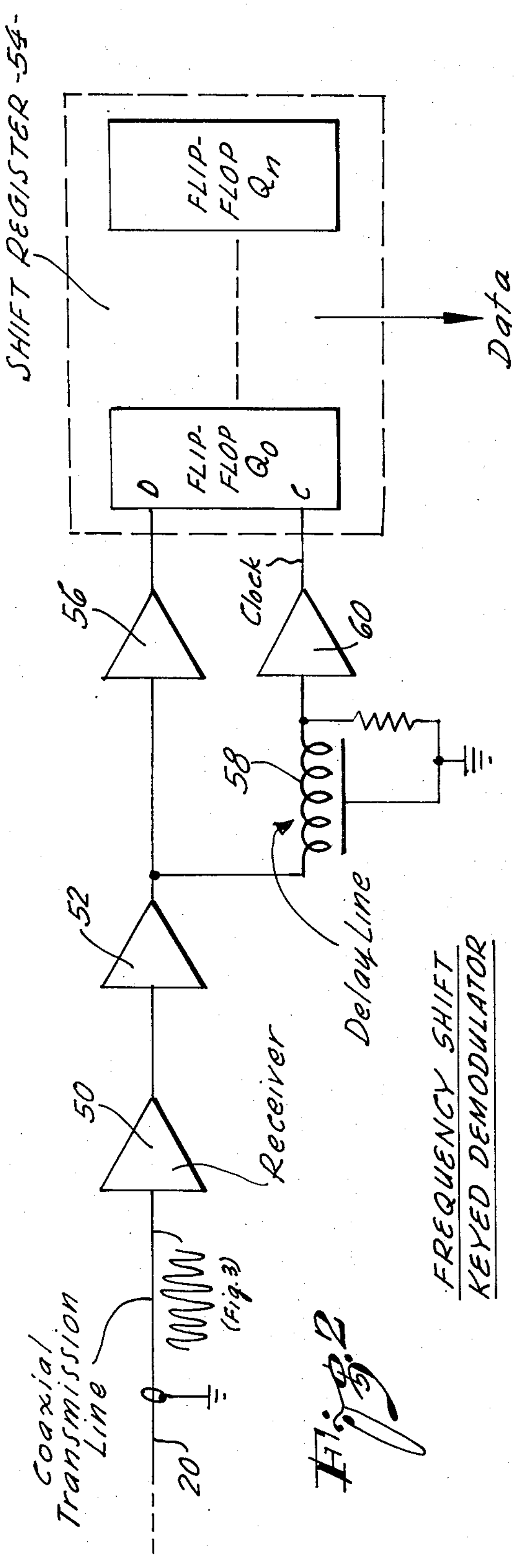
FIG. 2 is a schematic diagram of a receiver for use in the system of the invention.

The demodulator portion of the system of the invention is shown in FIG. 2. The system of FIG. 2 includes an amplifier 50 which receives the signal transmitted over the transmission line 20, and which amplifies the signal and applies it to a further amplifier 52. The signal may have a wave form such as shown in FIG. 3 as it is received by the unit 50.

The demodulator also includes a shift register 54 which may be similar to the shift register 10 of FIG. 1. The shift register 54 is made up, for example, of a series of flip-flops $Q_0 \ldots Q_n$, connected in known manner. The amplifier 52 further amplifies the signal of FIG. 3 and applies it to an amplifier and wave shaper 56, and through a delay line 58 to an amplifier and wave shaper 60. The amplifier 56 is connected to an input terminal "D" of the flip-flop $Q_0$ in the shift register 54, and the amplifier 60 is connected to an input terminal "C" of the flip-flop.

The delay of the delay line 58 corresponds to twice that of the full delay line 22 in FIG. 1. It causes the amplifier 60 to produce positive clock pulses. Each clock pulse for each cycle of the received signal is formed from the previous pulse. Only when 0 bits are received are the clocks and signal wave forms synchronous. The flip-flop $Q_0$ requires a specific set up time, of the order of 35 nano-seconds, during which the data input must be present and stable. The set up time is terminated by the edge of the corresponding clock.

The input circuitry of the flip-flop $Q_0$ is such that the flip-flop assumes its true state for each cycle of input data in which the data and the corresponding clock are asynchronous, and the flip-flop assumes its false state for each cycle in which the data and the corresponding clock are synchronous. The shift register is connected in known manner that for each succeeding clock the data is shifted from one flip-flop to the next.

The invention provides, therefore, an improved data communication system, in which binary data may be transmitted by frequency shift techniques at high speed from one point to another. No stability problems have been encountered at ambient temperatures and normal voltage ranges. The maximum toggle rate of the flip-flops in the shift registers of FIGS. 1 and 2 determines the maximum data rate.

While a particular embodiment of the invention has been illustrated and described, modifications may be made, and it is intended to cover all such modifications in the appended claims which come within the spirit and scope of the invention.

What is claimed is:

1. In a high-speed frequency-shift keyed digital data communication system, a digital phase-shift modulator circuit including: first and second gates; an output circuit connected to said gates; input means for introducing binary signals on a serial basis to said gates and introducing a signal to said first gate for a binary "1" and for introducing a signal to said second gate for a binary "0", said signals to be passed by said respective gates to said output circuit to establish the first half cycles of a signal in said output circuit; delay line means connected to said output circuit and to respective ones of said gates to return the signal from said output circuit to respective ones of said gates with first and second delays so as to disable said respective gates at different times for the second half cycle of each signal passed by said gates to said output circuit; and circuit means connecting said output circuit to said input means for introducing a clock pulse to said input means during each of said second half cycles to control the serial introduction of said binary signals from said input means to said first and second gates.

2. The data communication system defined in claim 1, and which includes a data receiver including a frequency-shift keyed demodulator, and transmission means intercoupling said output circuit of said modulator to said demodulator.

3. The data communication system defined in claim 2, in which said data receiver includes a shift register coupled to said demodulator for serially receiving binary data therefrom.

* * * * *